(12) United States Patent
Scaramellini Burgos et al.

(10) Patent No.: US 12,656,837 B2
(45) Date of Patent: Jun. 16, 2026

(54) HARDWARE RECEIVER AND SUPPORT SET FOR INTERNET OF THINGS (IOT) SYSTEM DEVELOPERS

(71) Applicants: Juan Carlos Scaramellini Burgos, Cordoba (AR); Pablo Gabriel Diaz Ferrero, Cordoba (AR); Juan Carlos Wortley, Melbourne (AU); Christian Gerardo Bruenner, Cordoba (AR)

(72) Inventors: Juan Carlos Scaramellini Burgos, Cordoba (AR); Pablo Gabriel Diaz Ferrero, Cordoba (AR); Juan Carlos Wortley, Melbourne (AU); Christian Gerardo Bruenner, Cordoba (AR)

( * ) Notice: Subject to any disclaimer, the term of this patent is extended or adjusted under 35 U.S.C. 154(b) by 151 days.

(21) Appl. No.: 18/502,192

(22) Filed: Nov. 6, 2023

(65) Prior Publication Data

US 2024/0201753 A1 Jun. 20, 2024

(30) Foreign Application Priority Data

Dec. 19, 2022 (AR) ............................ P20220103511

(51) Int. Cl.
  *G06F 1/18* (2026.01)
  *F16M 13/02* (2006.01)
(52) U.S. Cl.
  CPC ............. *G06F 1/181* (2013.01); *F16M 13/02* (2013.01)

(58) Field of Classification Search
  CPC . G06F 1/181; G06F 1/183–188; H05K 5/006; H05K 5/0247; H05K 2201/09754; H05K 2201/0999; H05K 9/0039; H05K 7/1422; H01R 13/6658; H02K 9/223
  USPC .................................................. 361/790, 796
  See application file for complete search history.

(56) References Cited

U.S. PATENT DOCUMENTS

| | | | | |
|---|---|---|---|---|
| 8,902,598 B2 * | 12/2014 | Chin | ....................... | G06F 1/182 |
| | | | | 361/752 |
| 10,993,323 B2 * | 4/2021 | Elsing | .................... | H05K 1/116 |
| 12,422,884 B2 * | 9/2025 | Rowsell | .................... | G06F 1/20 |
| 2016/0095239 A1 * | 3/2016 | Kawamata | ........... | H05K 5/0247 |
| | | | | 361/807 |
| 2020/0008314 A1 * | 1/2020 | Kuroiwa | ................ | H02K 9/223 |
| 2020/0132644 A1 * | 4/2020 | Micalizzi | ................ | H04Q 9/00 |
| 2021/0307189 A1 * | 9/2021 | Lucero | ................... | H05K 7/142 |

* cited by examiner

*Primary Examiner* — Brian T Misiura
(74) *Attorney, Agent, or Firm* — Defillo & Associates, Inc; Evelyn A. Defillo

(57) ABSTRACT

A hardware receiver and support set for developers of Internet of Things (IoT) systems, such as physical objects (or groups thereof) with sensors, processing capability, software, and other technologies that connect and exchange data with other devices and systems via the Internet or other communication networks, including a first cover piece (2) and a second base piece (3), both pieces operatively linked to each other forming a multipurpose enclosure (1). Inside the enclosure, on the second base piece (3), there are anchor tabs (5) for securing a base plate (6) arranged through holes (14) and fastening screws (4). In turn, the base plate (6) integrally includes multiple connection sockets of a generic type (7) and female base plate connectors (PCB) (8), (9), (10), (11), (12), a double terminal power connection device (13), and an infrared sensor (44).

7 Claims, 15 Drawing Sheets

1

2

3

16

15

15

17

18

18

41

20

39

3

43

1

HARDWARE RECEIVER AND SUPPORT SET FOR INTERNET OF THINGS (IOT) SYSTEM DEVELOPERS

TECHNICAL FIELD OF THE INVENTION

The present application pertains to a "Hardware receiver and support set for Internet of Things (IoT) system developers," which includes physical objects (or groups thereof) equipped with sensors, processing capability, software, and other technologies that connect and exchange data with other devices and systems via the Internet or other communication networks.

BACKGROUND OF THE INVENTION AND PROBLEMS TO BE SOLVED

In the market, there are various well-known companies that specialize in open-source software and hardware development. These companies design and manufacture boards intended for hardware development to create digital and interactive devices capable of detecting and controlling real-world objects. As each one of these devices tends to have a different architecture and unique features, there are existing differences among hardware components, enclosures, and boards that can pose challenges when trying to design multiple applications that can quickly adapt, maintain a compact form factor, reduce development time, and facilitate physical design with multiple configurations to meet the developer's intended objectives.

Board designs use various microcontrollers and microprocessors. Typically, the hardware consists of a microcontroller connected in a "minimal system" configuration on a printed circuit board (PCB), to which expansion boards or "shields" (as commonly referred to in English) can be attached via the arrangement of input and output ports present on the selected board.

The shields supplement the functionality of the selected board model by adding external circuits, sensors, and external communication modules to the original board. For example, variations of newer development board models that use 32-bit ARM microcontrollers coexist today with the previous generation, which integrates 8-bit AVR microcontrollers.

The ARM and AVR architectures are not the same, and their assembly is different as well. This can indeed present several challenges for developers when it comes to assembling the architecture.

In conclusion, the different hardware architectures, enclosures, and boards create the need for a different physical design (hardware, enclosures, and boards) based on the configuration required to achieve the developer's intended objective. For any solution that involves a combination of functions, it is either required a separate enclosure for each function or a generic enclosure that demands significant adaptation work. This can result in increased costs and consume a significant amount of valuable time that could otherwise be used to focus on the core problem's logic.

To address the previously mentioned problem, a solution is proposed: a receiver and hardware support assembly that includes a multipurpose enclosure for IoT system developers, a base plate or "backplane" board, a motherboard, and a power board mechanically linked together. This setup eliminates the need for cables, enhances its functionality across a wide range of sensor and actuator combinations existing in the prior art, providing a quick and secure hardware solution, and saving time for the developer in configuring the programming logic of the IoT system.

It also allows for the inclusion of widely available programmable electronics in the current market and provides space and flexibility for diverse types of power sources (DC/AC). It enables the combination of two sensors, two actuators, or a combination of actuator-sensor pairs, including any of the well-known generic type like "Arduino" sensors or actuators commonly used in the prior art.

In conclusion, the proposed assembly includes a multipurpose IoT enclosure designed to house a backplane board, a motherboard, and a power board, mechanically linked with a morphology and an arrangement that allows for a significant variety of combinations of sensors and actuators found in the prior art. This provides a quick and secure hardware solution while the developer saves time in the configuration of the IoT system logic programming. The design of these boards and their interlocking mechanisms allow for simple and secure connections, without the need for internal wiring among its components. It encompasses all the necessary electronics for a variety of approximately one hundred combinations of "Arduino" or "generic" type sensors and actuators, resulting in an improved functionality in completing any IoT development with substantial time saving in the development of enclosures, boards, and internal wiring, as the various construction variables are assembled with unique and multiple combinations of fastenings and interlocks, significantly reducing hardware development time.

Next, there is a summary of sensor and actuator combinations that the present multipurpose IoT enclosure can support, based on trials conducted by the inventors as a preferred embodiment example.

The present assembly allows for the combination of any sensor/sensor pair, sensor/actuator pair, or actuator/actuator pair that follows the "Arduino" type, meaning they feature a male PCB-type connector with 1 to 4 pins and voltage levels ranging from 0V to 5V.

Combinations Currently Available in the Market that Come with Associated Native Firmware.

1. Simple double-pole, double-throw (DPDT) relay (as a switch or pushbutton).
2. Combined double-pole, double-throw (DPDT) relay+ Ultrasonic distance sensor.
3. Simple Dimmer with Triac.
4. Simple Triac key mode.
5. Combined Dimmer+Double-Pole, Double-Throw (DPDT) Relay.
6. Combined Two Double-Pole, Double-Throw (DPDT) Relays.
7. Combined Two Triac Key Mode.
8. Combined Double-Pole, Double-Throw (DPDT) Relay+Infrared Sensor.
9. Combined Double-Pole, Double-Throw (DPDT) Relay+Temperature Sensor.
10. Simple Temperature Sensor.
11. Simple Ultrasonic Distance Sensor.
12. Simple Temperature and Humidity Sensor.

Combinations Currently Available in the Market that do not have Associated Native Firmware 13. Simple Gas Sensor.
14. Combined Double-Pole, Double-Throw (DPDT) Relay+Gas Sensor.
15. Simple Vapor Sensor.
16. Combined Double-Pole, Double-Throw (DPDT) Relay+Vapor Sensor.
17. Simple Water Level Sensor.

18. Combined Double-Pole, Double-Throw (DPDT) Relay+Water Level Sensor.

19. Simple Soil Moisture Sensor.

20. Combined Soil Moisture Sensor+Double-Pole, Double-Throw (DPDT) Relay.

In the current state of the art, there are at least fifty different "Arduino" type sensors and actuators, all of which can be paired within the enclosure according to the technical solution being addressed. The majority of any pair of these sensors and actuators with a pinout ranging from 1 to 4 pins are compatible with the multipurpose IoT enclosure.

The combinatorial number of selecting two elements from a set of fifty is calculated as shown below and results in 1225 combinations.

$$C_{50}^{2} = \frac{50!}{(50-2)!\,2!} = \frac{50!}{48!\,2!} = 1225$$

The configuration of the parts that make up the multipurpose IoT enclosure allows for the connection of the backplane board through mechanical-electrical interlocking between boards. A male linear multi-pin connector is inserted into a female linear multi-pin connector or a single female PCB connector. The mechanical fixation and electrical connection between the motherboard and the backplane, as well as between the power board and the backplane, and between sensors/actuators and the backplane, provide a multitude of configurations as per the user's needs for constructing the desired hardware architecture within a single enclosure (see FIG. 14).

Below, there is a description of the four typical examples currently available in the market:

Example 1, Schematic in FIG. 22

In order to sense a distance and turn on/off an indicator light or a motor when that distance changes. The current custom-made market solution involves using an Arduino board (FIG. 22) (36) placed inside a generic enclosure (37), an ultrasonic distance sensor with a plastic bracket (38) to secure and aim the sensor, obtaining a Relay board (39) for Arduino and placing it in the aforementioned generic enclosure or another smaller generic enclosure, addressing the mounting issues for the boards in their respective enclosures (sometimes they do not fit properly and require adhesives to secure them in place), connecting the wires (40) and connectors between the devices to interconnect these components that make up the solution, and testing the system to ensure mechanical and electrical robustness to mitigate risks. Next, the system's power supply needs to be resolved using one or two external power sources (41), depending on whether it is AC or DC power and the available voltages, which can commonly vary between 12 VDC or 110/220 VAC. This poses the challenge of ensuring compatibility between various components and consumes a significant amount of time searching for a solution with wired interconnections. It also requires extensive physical testing to ensure compactness and safety.

Example 2, Schematic in FIG. 23

Another market alternative (FIG. 23) is to obtain closed products: a closed distance sensor IoT device (42) and a closed Relay controller (39). Similarly, to the previous solution, these boxes need to be interconnected, and they should be powered according to each product's specifications. It is possible that they require different power sources. Additionally, there is the challenge of integrating the two devices from different manufacturers. The integration time for different brands or manufacturers is typically a hurdle when trying to develop a timely, well-supported post-sale solution of this kind.

The proposed solution involves the use of a multipurpose IoT enclosure (FIG. 24) comprised of a backplane board (6) at the base (3) of the enclosure (lodged on this backplane board is the ultrasonic sensor mounted in one socket oriented toward the openings (17)), the Relay mounted in the second socket (39), and the mother (20) and power (28) boards. This assembly constitutes the processor and power source for the entire system since the power supply (41) can be either 12 VDC or 110/220 VAC, without the need for additional wiring. The backplane board (6) serves as the interconnection and integration platform for the system. Once the cover (2) is screwed, the system is physically ready to begin addressing the logic or software (FIG. 25).

Example 3, Schematic in FIG. 26

In order to detect presence and turn on/off an indicator light or a motor when the detection occurs. An existing market solution involves using an Arduino board inside a generic enclosure (27) (FIG. 26), an infrared sensor (44) with a plastic bracket (38) for securing and aiming the sensor, a Relay board for Arduino (36) to be installed in the same or another smaller generic enclosure, addressing the mounting of the boards in their respective enclosures (often requiring adhesives due to the fact that they do not fit properly), connecting the cables (40) and connectors to interconnect these components, testing the system, resolving the system's power supply with one or two external power sources (41) (adding more parts to the system) to be defined based on whether it is AC or DC power and the available voltages, which can commonly vary between 12 VDC or 110/220 VAC. The time spent in designing the hardware solution consumes the necessary time for logic development, and the drawback is that a solution with wired interconnections requires extensive physical testing to ensure it is compact and safe.

Example 4, Schematic in FIG. 27

Another market alternative (FIG. 27) involves acquiring closed products: a closed IoT infrared sensor (44) and a closed IoT Relay controller (39). Similarly, to the previous solution, these boxes need to be interconnected, and they should be powered according to each product's specifications. It is possible that they require different power sources. Additionally, there is the challenge of integrating two devices from different manufacturers. The integration time for different brands or manufacturers is typically a hindrance when trying to develop a timely, well-supported post-sale solution of this kind.

The proposed solution involves using the Multipurpose IoT Enclosure, as detailed in FIG. 28. Once the backplane board (6) is securely attached to the enclosure's cover (2), the infrared sensor is precisely fitted into its dedicated socket, aligning it perfectly with the predetermined opening in the cover. The Relay (39) is inserted into the second socket, and adding the mother (20) and Power (28) boards completes the processor and power supply for the entire system, which can be either 12 VDC or 110/220 VAC, depending on the requirements. After screwing the base, the assembly time for the system is minimal (with practice, it takes 5 minutes).

LIST OF COMPONENTS
Reference table

| | |
|---|---|
| 1 | Enclosure |
| 2 | First piece: Enclosure cover |
| 3 | Second piece: Enclosure base |
| 4 | Securing screws |
| 5 | Anchor tabs with fastening holes |
| 6 | Base plate or backplane |
| 7 | Single-Row Female PCB Base Connectors (Generic) |
| 8 | Single-Row Female PCB Base Connectors with Two Pins |
| 9 | Single-Row Female PCB Base Connectors with Three Pins |
| 10 | Single-Row Female PCB Base Connectors with Four Pins |
| 11 | Single-Row Female PCB Base Connectors with Five Pins |
| 12 | Single-Row Female PCB Base Connectors with Ten Pins |
| 13 | Double Terminal Block with Cable Clamps |
| 14 | Mounting Holes |
| 15 | Side Fixing Fins |
| 16 | Enclosure cover hole |
| 17 | Cable Pass-Through Hole |
| 18 | Blind Cover for Connection Holes |
| 19 | Fixing Fin Device |
| 20 | Motherboard |
| 21 | Power Indicator LED |
| 22 | Pin Selector Jumper |
| 23 | Pin Selector Jumper |
| 24 | Delay Circuit |
| 25 | Processor |
| 26 | Interfaces |
| 27 | Reset Button |
| 28 | Power Board |
| 29 | Input Voltage Pins |

-continued

LIST OF COMPONENTS
Reference table

| 30 | Free pin |
| 31 | Ground (GND) Pin |
| 32 | Output Voltage Pin |
| 33 | 3.3 Volt Ground (GND) Pin |
| 34 | 5 Volt Ground (GND) Pin |
| 35 | 12 Volt Ground (GND) Pin |
| 36 | Generic or Arduino-type board |
| 37 | Generic Enclosure |
| 38 | Mounting Bracket |
| 39 | Relay Board |
| 40 | Connection Cable |
| 41 | Power Supply |
| 42 | Distance Sensor |
| 43 | Ultrasonic Sensor |
| 44 | Infrared Sensor |

DESCRIPTION OF THE INVENTION

In order to make the present invention understandable, a brief description of an embodiment of the invention is provided below as an illustrative and non-limiting example. The components of this embodiment may be selected from various equivalents without departing from the principles set forth in this document.

Figure 1:
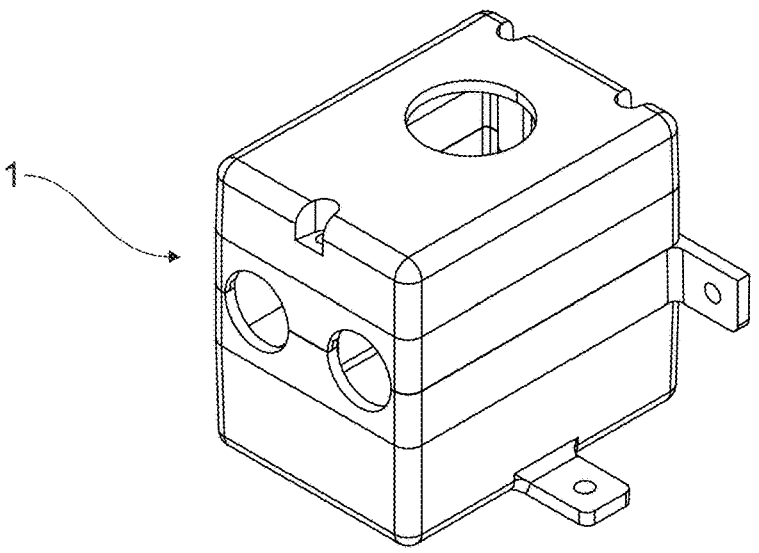
FIG. 1 depicts a perspective view of the Multipurpose IoT Enclosure.
Figure 2:
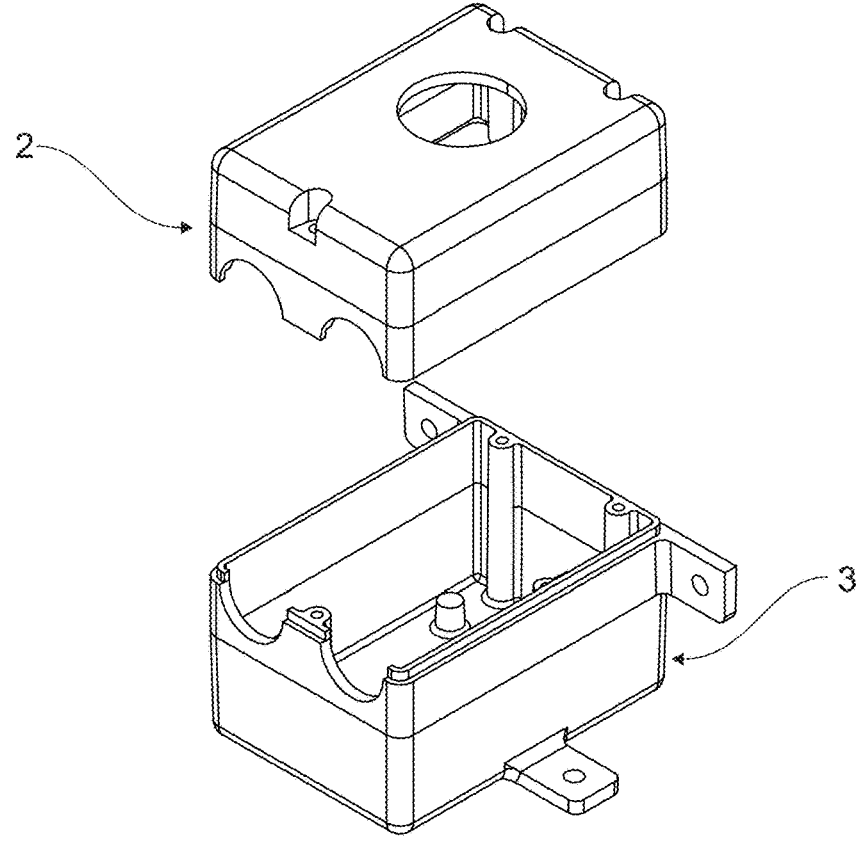
FIG. 2 provides a perspective view of FIG. 1, revealing its component parts: the first piece (2), which is the enclosure cover, and the second piece (3), which serves as the enclosure base.

The present invention includes a multipurpose enclosure (1) for supporting hardware for IoT system developers as shown in (FIG. 1). The enclosure (1) comprises two pieces (2) and (3); the volume of these two pieces is similar to a rectangular prism, defining an upper cover (2) and a lower base (3), which are connected together with three fixing screws (4) arranged in anchor tabs (5) with fastening holes.

These anchor tabs (5) are located inside the enclosure as follows: two at the bottom of the front end, parallel, spaced apart, and attached to the side walls, and one at the rear distal end attached to the bottom and the wall of said enclosure.

Figure 3:
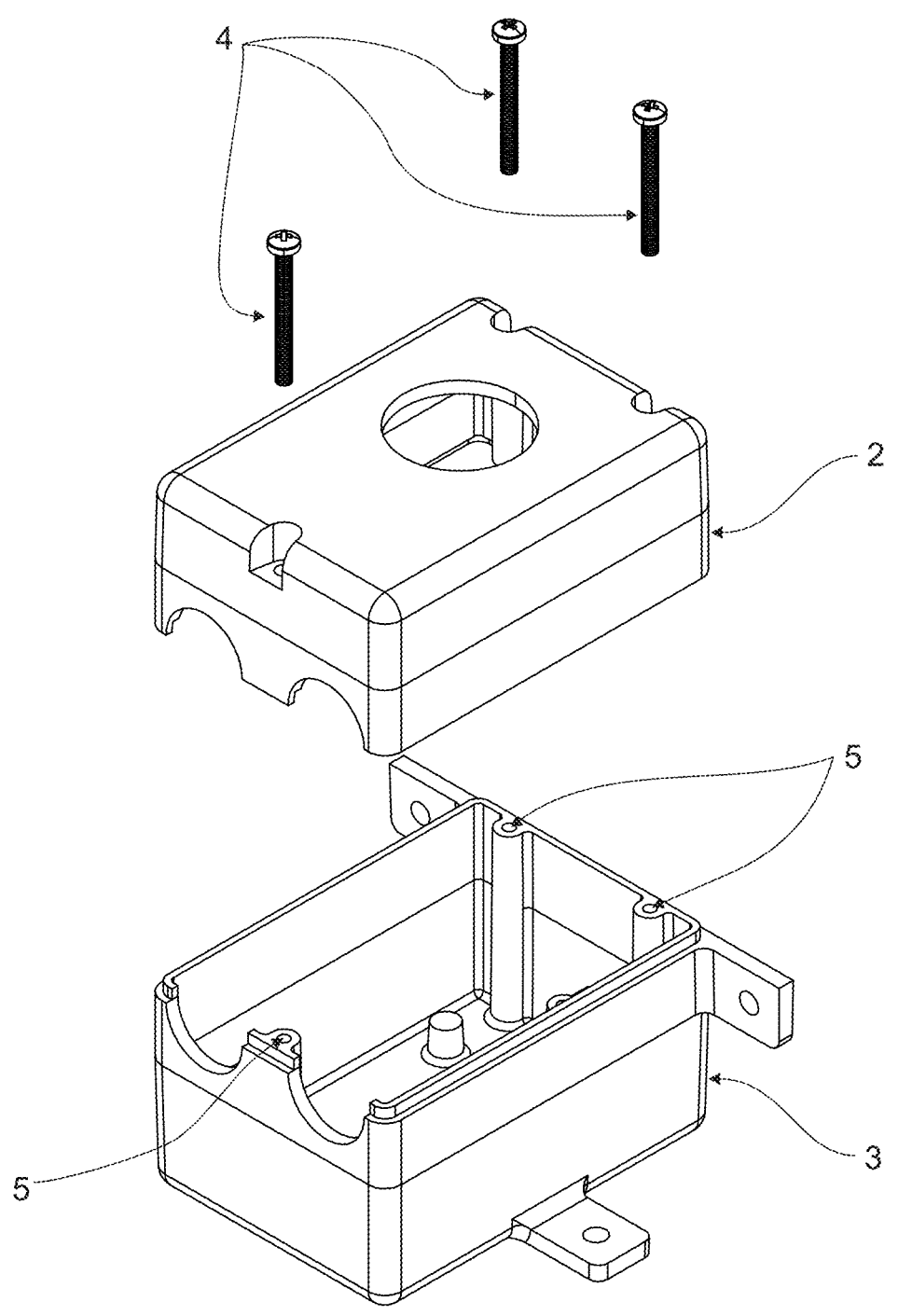
FIG. 3 provides a perspective view of the cover (2) and base (3) arranged with the securing screws (4) and anchor tabs (5) with fastening holes.
Figure 4:
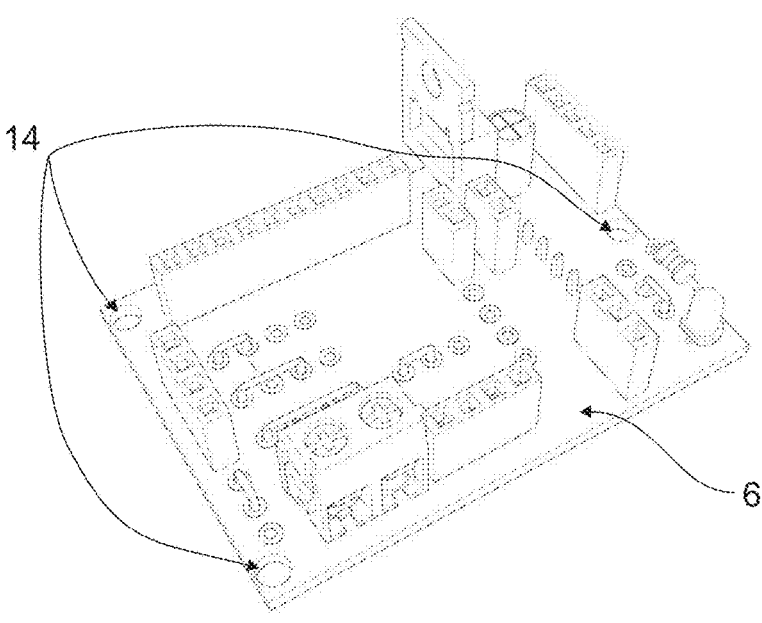
FIG. 4 provides a perspective view of the base plate (6) (Backplane), where the mounting holes (14) can be seen.

Furthermore, the two pieces (2, 3), both the upper cover (2) and the base (3), are designed to accommodate the backplane (6) by means of holes (14) for securing with the fastening screws (4). This arrangement of fixing holes allows for the accommodation of the backplane (6) in both the first upper cover piece (2) and the second lower base piece (3). In both cases, the attachment points are arranged in a mirrored fashion to be connected with the screws (4). (FIG. 3).

Figure 5:
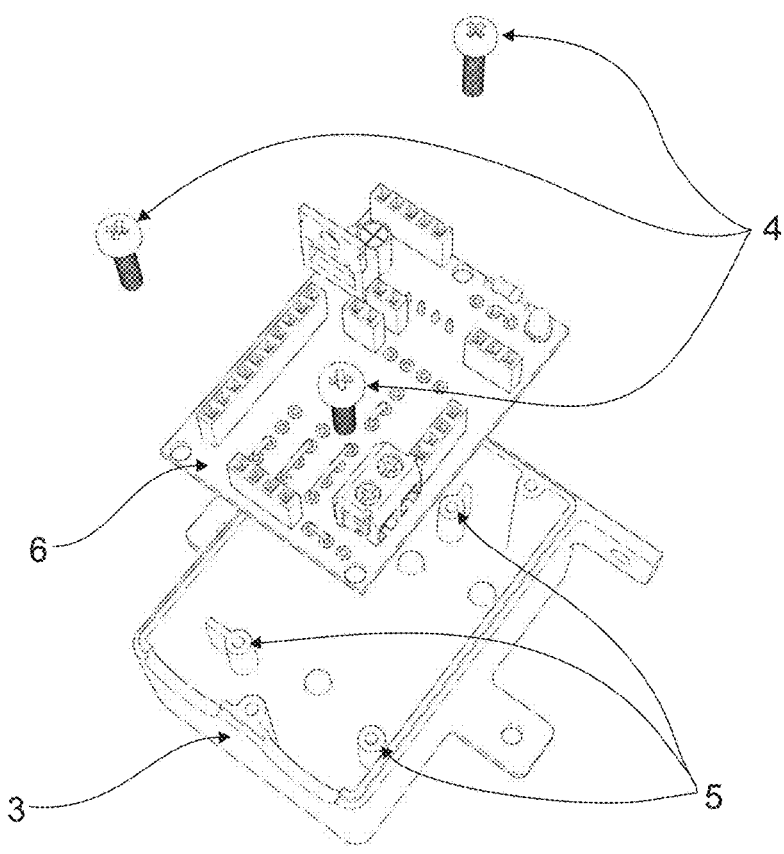
FIG. 5 provides a perspective view of the arrangement of the base plate or backplane (6) placed on the base (3), where the tabs (5) with fastening holes and securing screws (4) can be observed.
Figure 6:
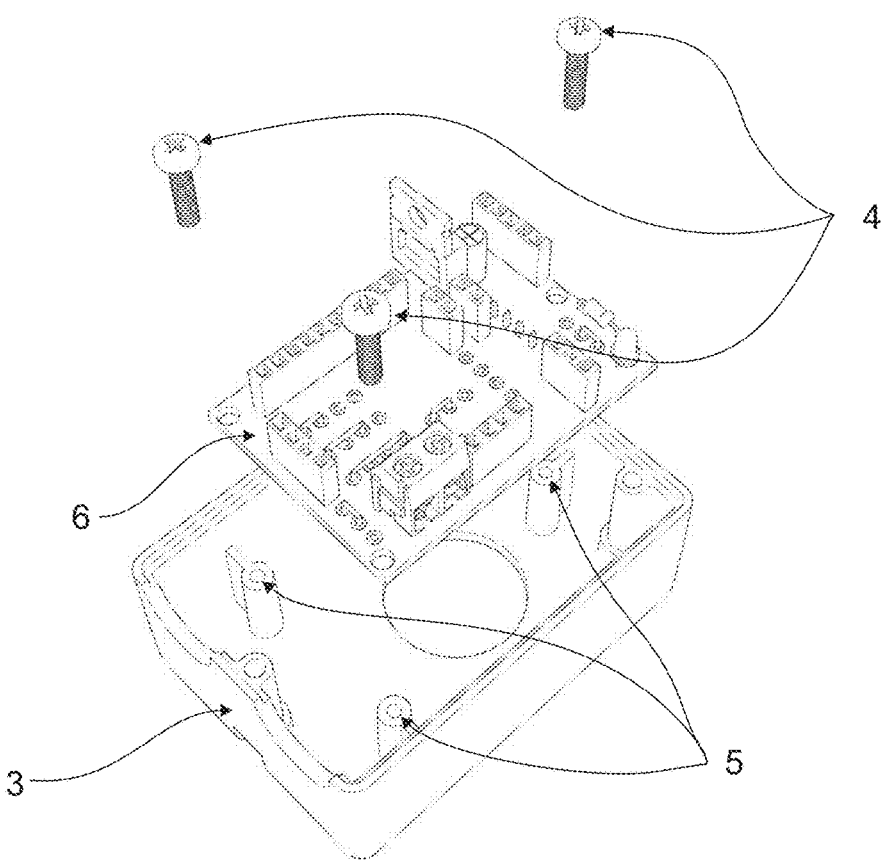
FIG. 6 provides a perspective view of the base plate (6) (Backplane) on top of the cover (2), where the tabs (5) with fastening holes and securing screws (4) can be observed.
Figure 7:
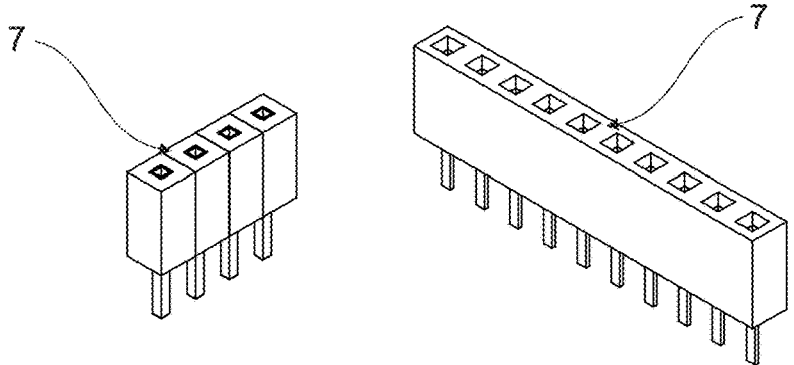
FIG. 7 provides a perspective view of the types of single-row female PCB connectors (7).

The alternative choice in the arrangement of the backplane (6), whether housed in the second base piece (3) or housed in the first cover piece (2) of the enclosure (1) (FIG. 1), allows for the modification of the enclosure's design configuration. This flexibility enables the accommodation of a wide variety of sensor and actuator combinations while maintaining the morphology according to the user's architectural needs. (FIG. 5 and FIG. 6)

Figure 8:
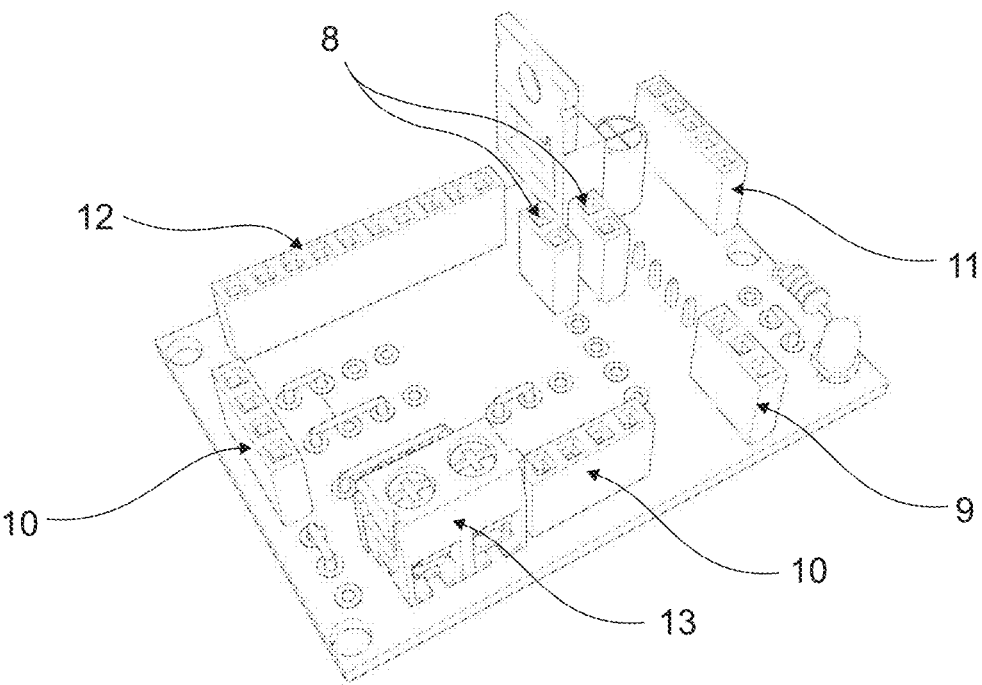
FIG. 8 provides a detailed perspective view of the arrangement of single-row female PCB connectors with two pins (8), three pins (9), four pins (10), five pins (11), and ten pins (12) on the sockets of the base plate (6) (backplane), along with a double terminal block with cable clamps (13).
Figure 14:
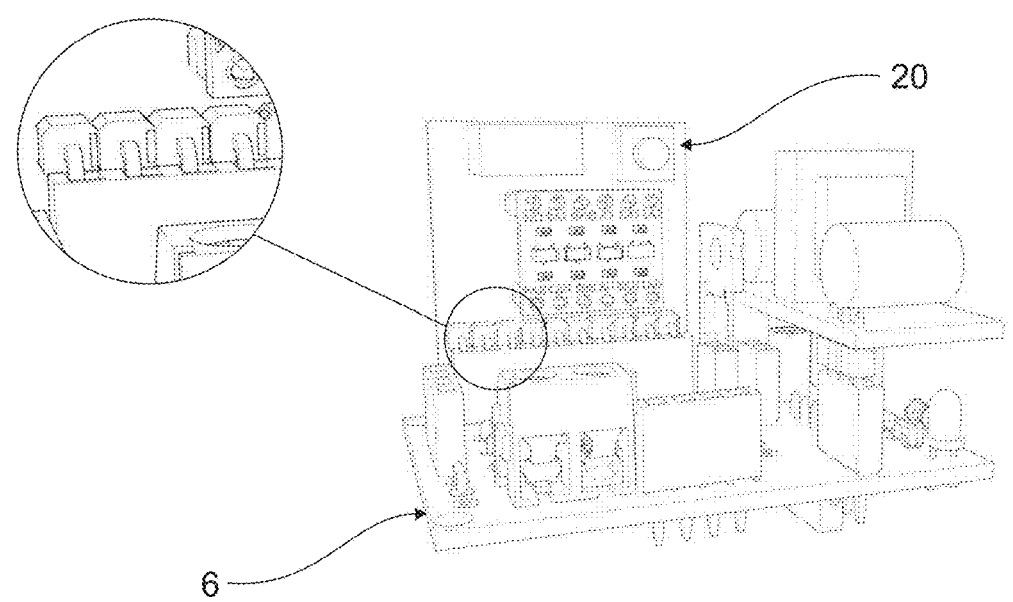
FIG. 14 is a perspective view of the base plate (6) (Backplane) connected to the motherboard (20), showing in detail the mechanical attachment and electrical connection between the base plate (6) and the motherboard (20).
Figure 15:
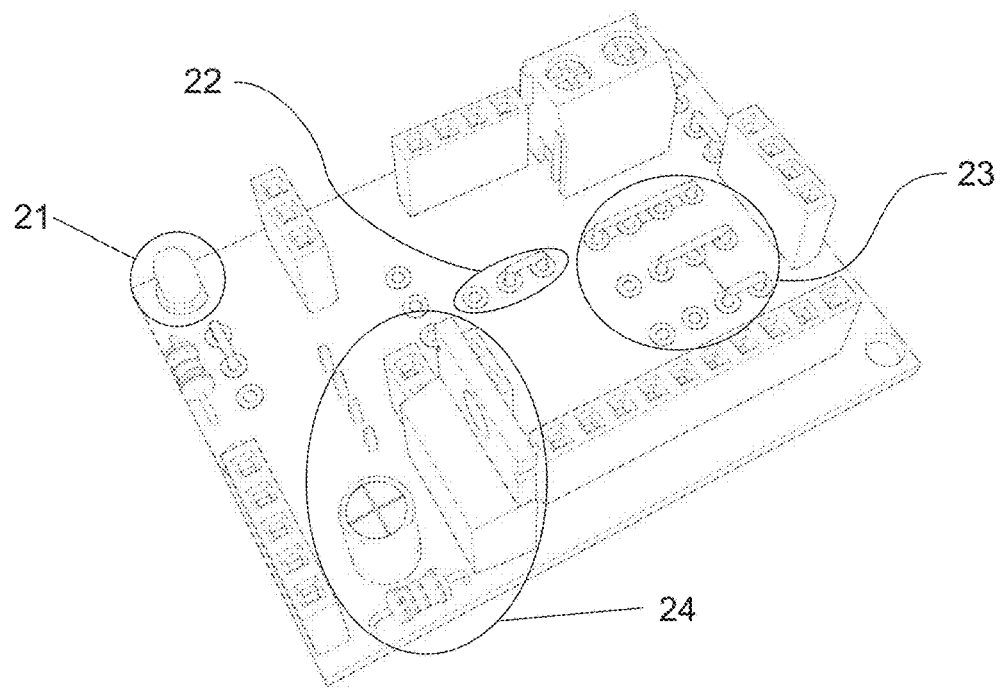
FIG. 15 depicts a perspective view of the complete and integrated backplane board (6) where the arrangement of components can be observed, including a power indicator LED (21), a pin selector jumper (22), a pin 1 or 3 selector jumper to be used in socket 1, and the jumper wiring matrix for soldering (23). Additionally, it shows the arrangement of the delay circuit (24) designed for system startup protection, in an example embodiment configuration.
Figure 16:
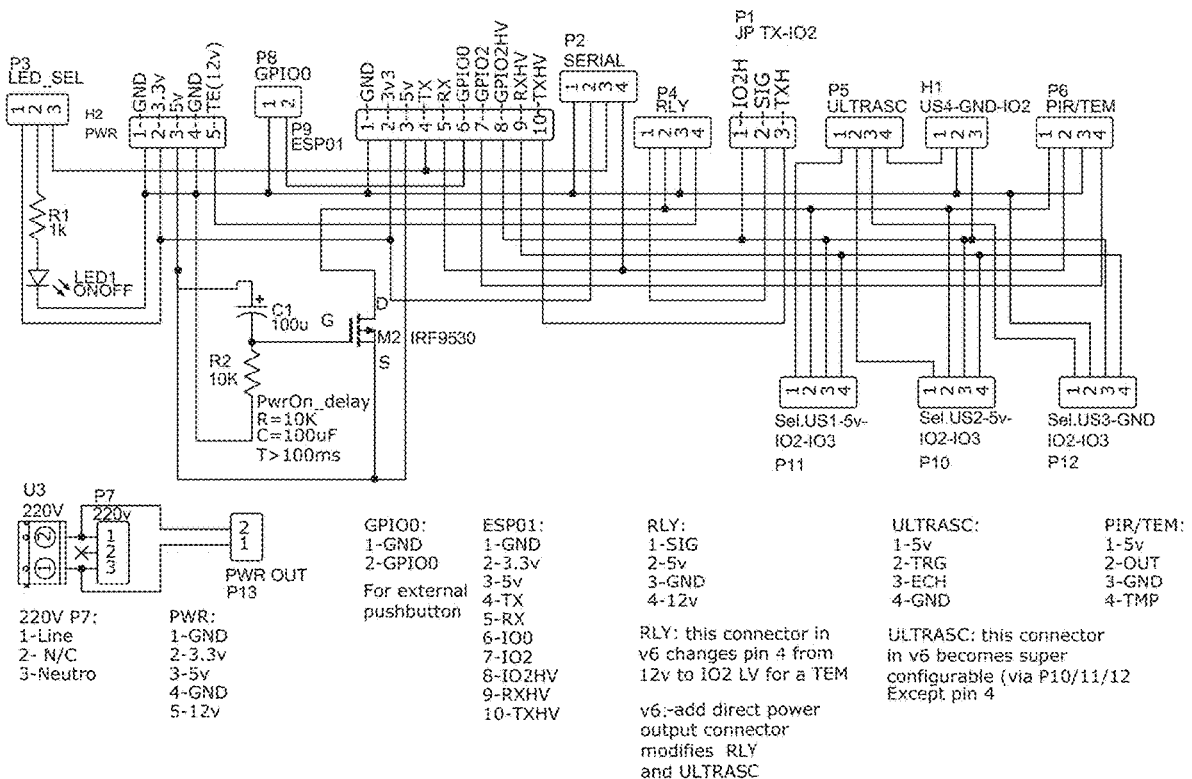
In FIG. 16 it can be observed in detail the schematic circuit of the base plate (6) (Backplane).
Figure 17:
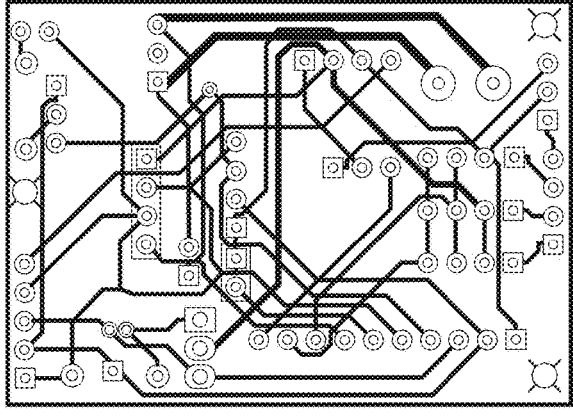
FIG. 17 provides a detailed view of the PCB design of the base plate (6) (Backplane), as mentioned in FIG. 16.

Once the backplane (6) is secured to either the second base piece (3) or the first cover piece (2), based on the type of device to be configured, the aforementioned backplane (6) is equipped with female PCB sockets (7) with at least five pin combinations (FIG. 8). These sockets serve the purpose of mechanical attachment to the motherboard (20) and/or the power board (28), providing both mechanical fixation and electrical connection between the boards and sensors, eliminating the need for internal wiring between the motherboard and the power board, as well as between the sensors/actuators, thus improving the mechanical linkage and electrical connection function between the boards (FIG. 14).

Figure 9:
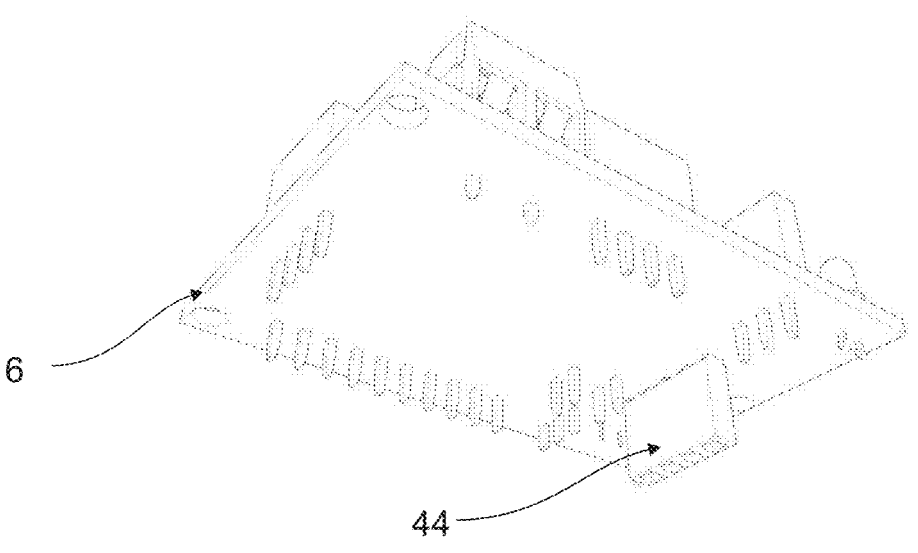
FIG. 9 depicts a bottom view of the base plate (6) (Backplane), showing the arrangement of an infrared sensor (44).
Figure 10:
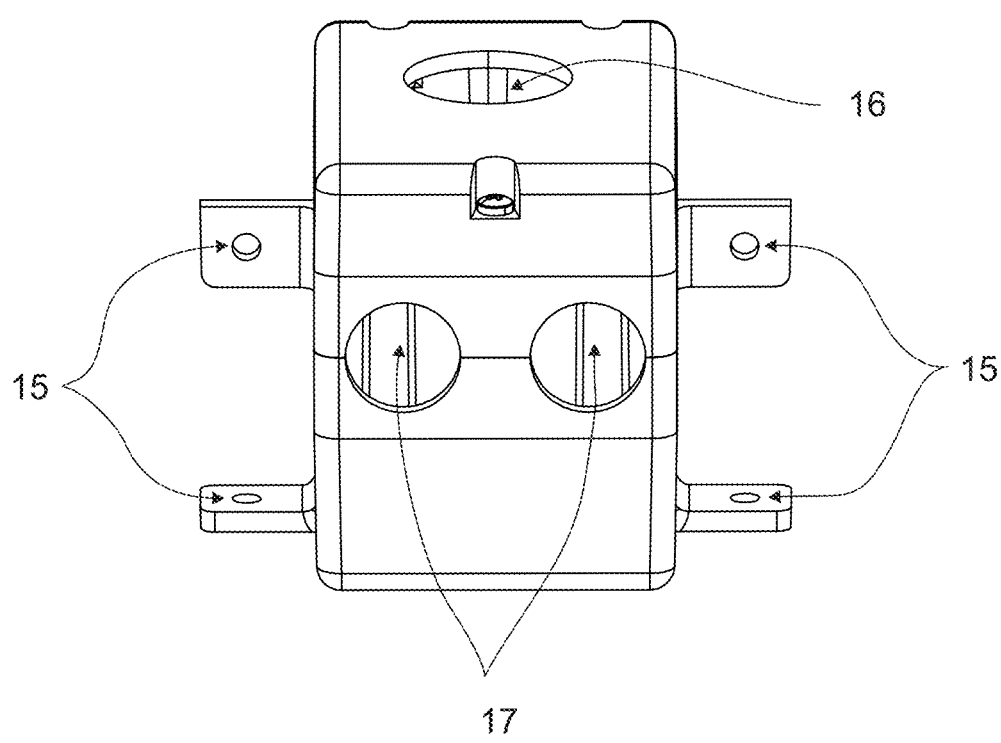
FIG. 10 provides a perspective view of the multipurpose IoT enclosure (1), where the side fixing fins (15), the hole (16) in the first cover piece of the enclosure (2), and cable pass-through holes (17) in both the first cover piece of the enclosure (2) and the second base piece (3) can be observed.
Figure 11:
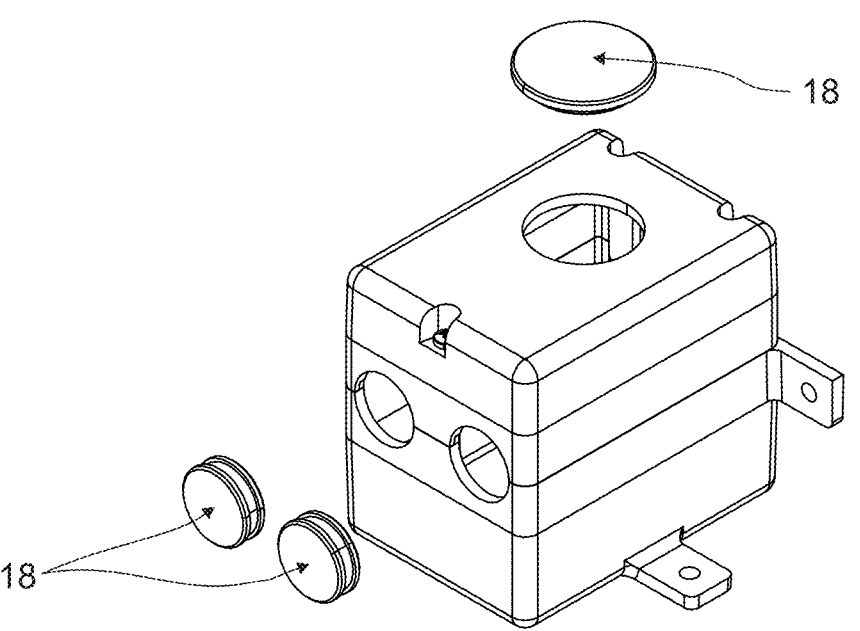
FIG. 11 provides a perspective view of the Multipurpose IoT Enclosure (1), where the blank covers (18) that seal off the connection holes can be observed.
Figure 21:
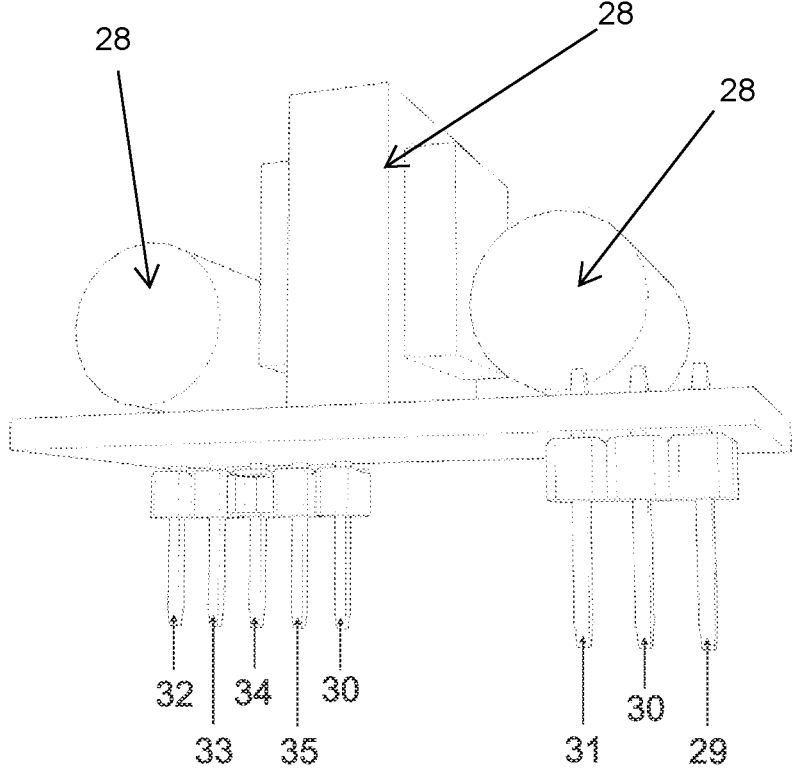
FIG. 21 depicts a perspective view of the power board (28) and its components, where the input voltage pins for 12V/110V/220V (29), unconnected free pin (30), ground (GND) pin (31), GND output voltage pin (32), 3.3-volt GND pin (33), 5-volt GND pin (34), 12-volt GND pin (35), and free pin (30) can be seen.
Figure 22:
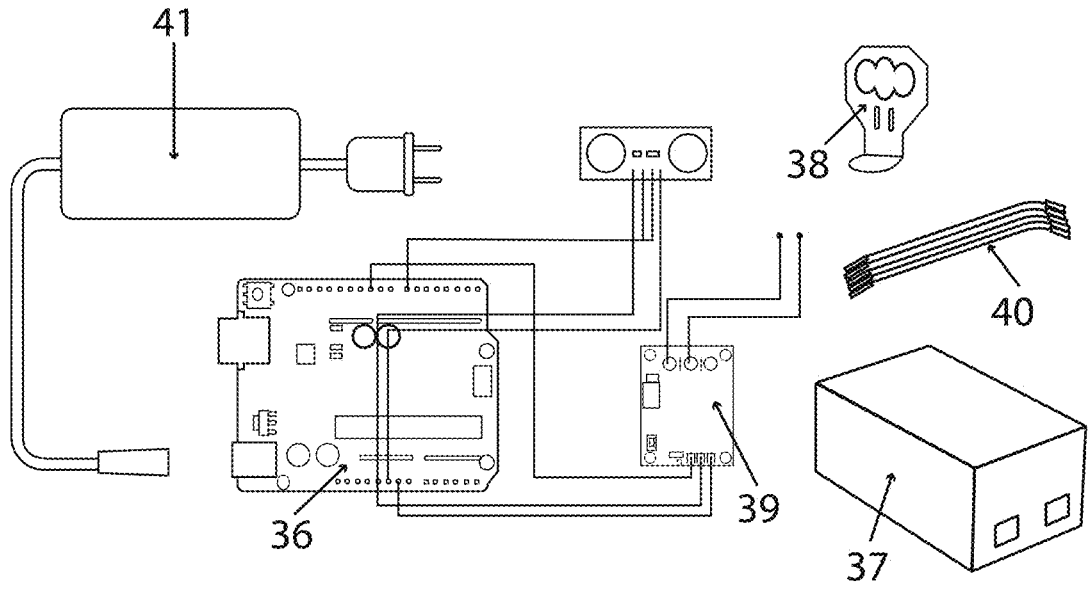
FIG. 22 is a schematic of an example of a customized common-use IoT solution in the market, where you can see an Arduino board (36), a generic enclosure (37), a mounting bracket (38), a relay board (39), connection cables (40), and a power supply (41).
Figure 23:
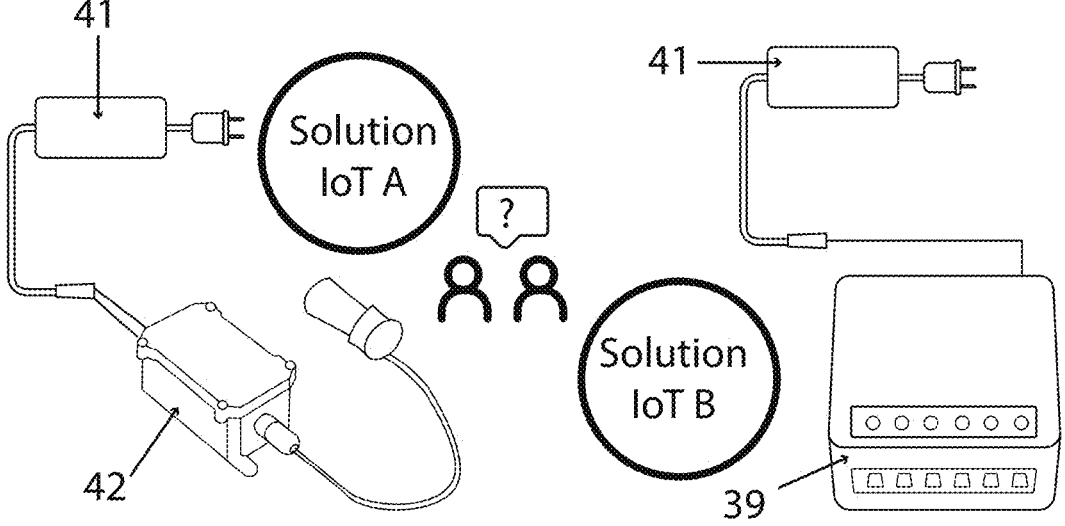
FIG. 23 is a schematic of a second example of an IoT solution using off-the-shelf components, where a distance sensor (42), a relay (39), and a power supply (41) can be seen.
Figure 24:
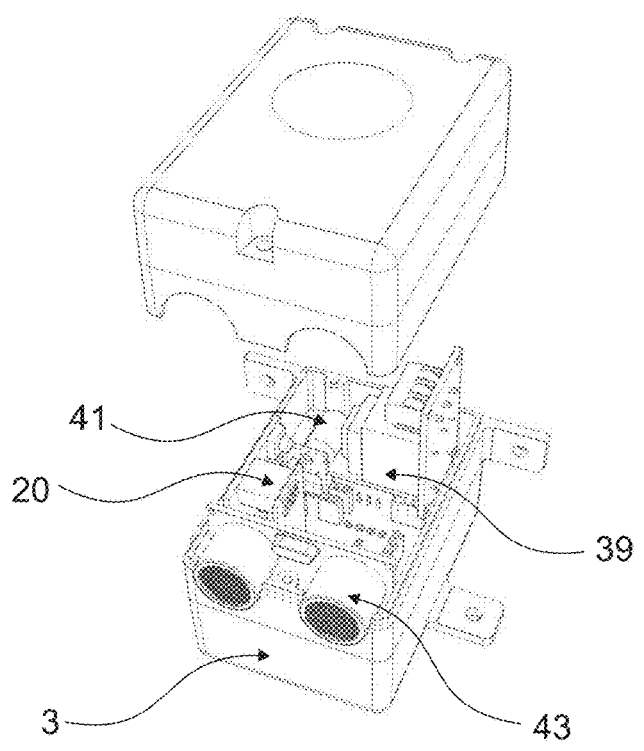
FIG. 24 depicts a perspective view of the example embodiment on the second base piece (3) with various components, where the motherboard (20), the relay (39), the power supply (41), and the ultrasonic sensor (43) can be observed.

The backplane (6) features a configuration of 7 (seven) female PCB sockets (FIG. 8). The 10-pin socket (12) accommodates the motherboard (20), which contains the microprocessor and electronic interfaces for adapting to generic or "Arduino" voltage levels (3.3 v and 5 v DC). Furthermore, the 3-pin socket (9) and the 5-pin socket (11) accommodate the power board (28) (FIG. 21) with a double socket in charge of converting the external voltage (220 v/110 v AC, 12 v DC) and supplying circuits with 3.3 v and 5 v DC voltages. In addition, the 4-pin sockets (10) are multipurpose and suitable for connecting generic or "Arduino" type sensors or actuators, which are configurable with jumpers, providing great flexibility in adapting the pin configuration for these sockets to any variety of 1 to 4 pins. Furthermore, the non-configurable multipurpose 4-pin socket (10) (FIG. 9) is designed to accommodate a generic or "Arduino" type infrared sensor, which is mounted in the hole on the enclosure cover (17) (FIG. 10). In this case, the backplane (6) is mounted on the first upper cover piece (2).

Figure 18:
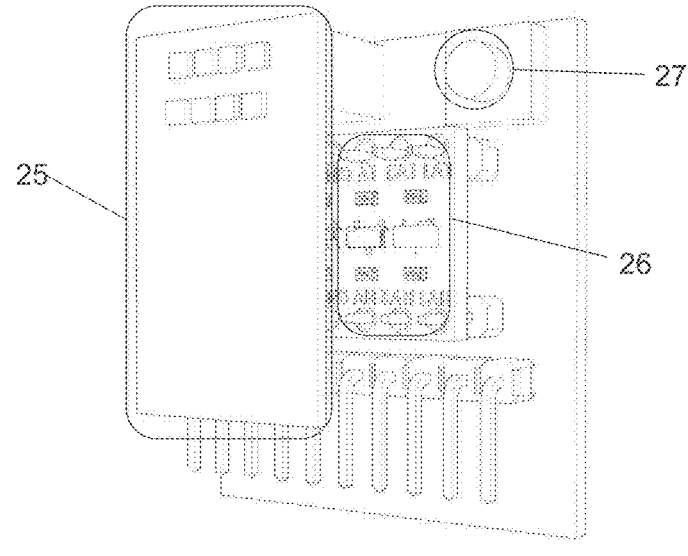
FIG. 18 provides a perspective view of the motherboard (20), showing the arrangement of the processor (25), interfaces (26), and the reset button (27).
Figure 19:
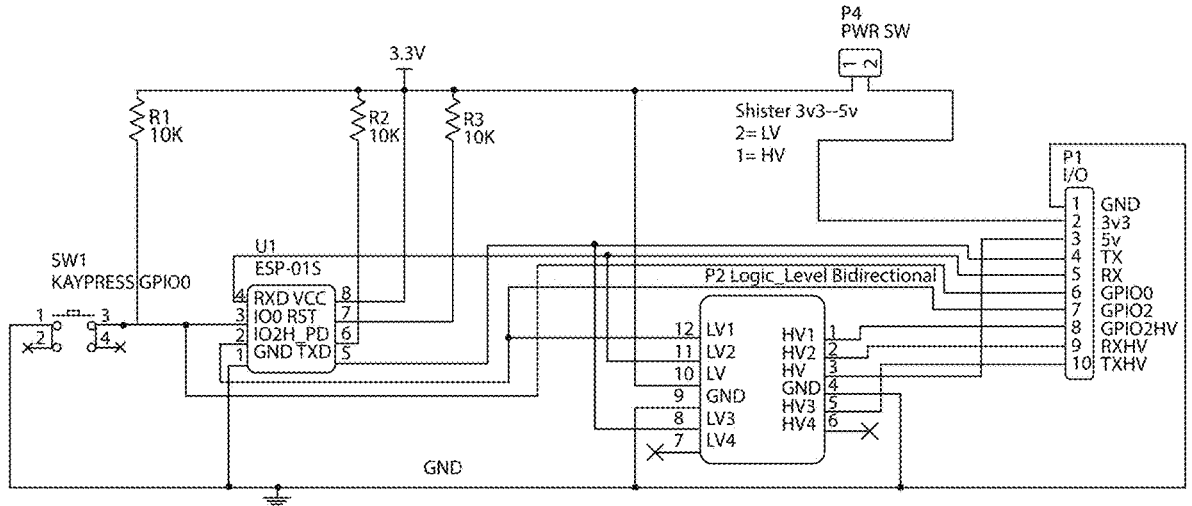
FIG. 19 depicts a schematic diagram of the motherboard (20).
Figure 20:
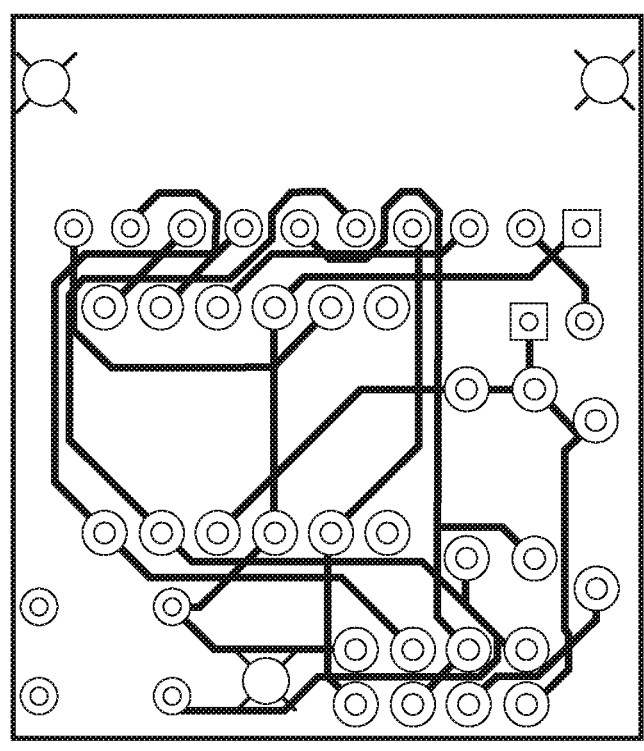
FIG. 20 provides a detailed view of the PCB design of the motherboard (20) (mother).

In the aforementioned backplane (6), there are two 2-pin sockets (8) (FIG. 8), which function is the external output of the motherboard (27) reset button (FIG. 18), which serves as the input voltage sample for use in the control of the "Arduino" type actuator known as "Dimmer".

Furthermore, in the aforementioned backplane (6), there is a double terminal block with screw clamps (13) (FIG. 8) for the input voltage connection.

Figure 12:
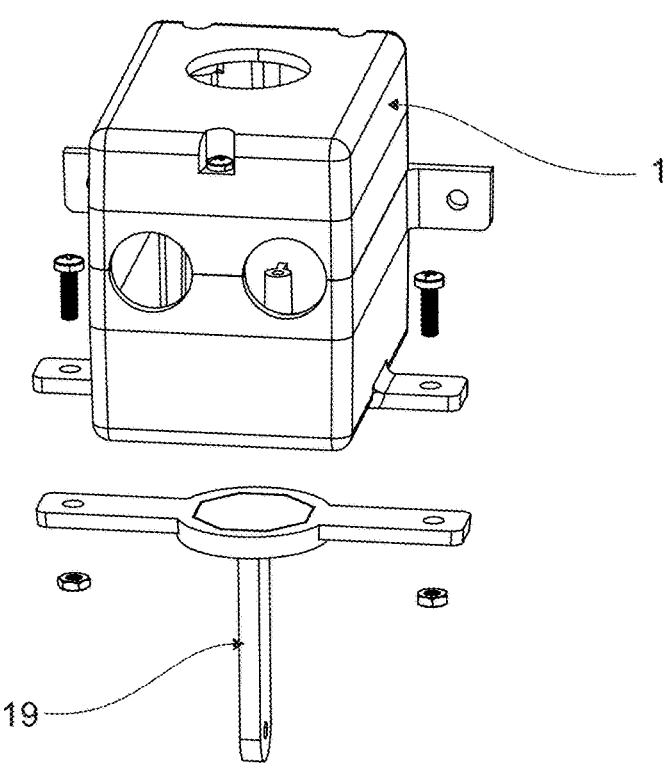
FIG. 12 is a vertical perspective view of the enclosure (1), showing the fixing fin devices (19).
Figure 13:
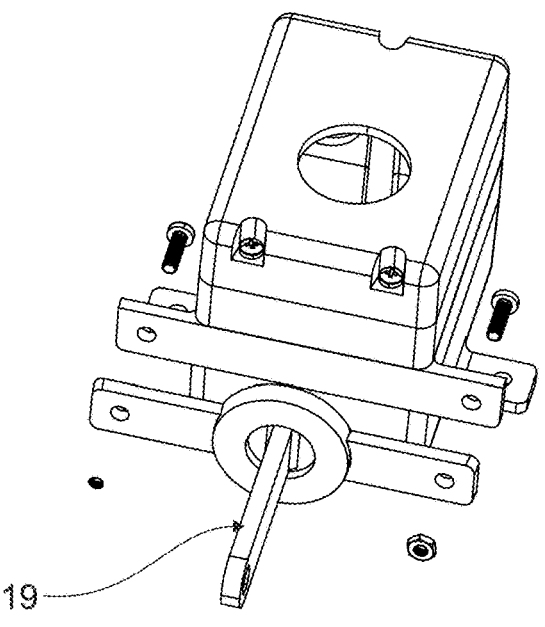
FIG. 13 is a vertical perspective view of the enclosure (1), where the securing devices (19) can be observed.

The multipurpose IoT enclosure features 90-degree fixing side fins (19) (FIG. 12) and (FIG. 13) to secure the enclosure to the surface using screws and nuts at the appropriate angle. Alternatively, it allows configuring a modular system of multiple units linked together in a block format, depending on the required application.

From a morphological perspective, the first cover piece (2) and the second base piece (3) on their front face form a semicircular arch (17), where the arch, when supported on its two endpoints, takes the shape of a half-circle. Thus, its center is at the same height and in the center of the imaginary horizontal line that connects its endpoints, forming two perfect circles that serve as cable pass-through for external wiring and as accommodation and fixation points for the "Arduino" type ultrasonic sensor or simply for ventilation (FIG. 10).

Furthermore, the first cover piece (2) of the enclosure (1) features a hole (16) with a diameter suitable for a generic or "Arduino" type infrared sensor, which serves the purpose of accommodating and securing the sensor or as a cable pass-through for external wiring, or simply for ventilation (FIG. 10).

Figure 25:
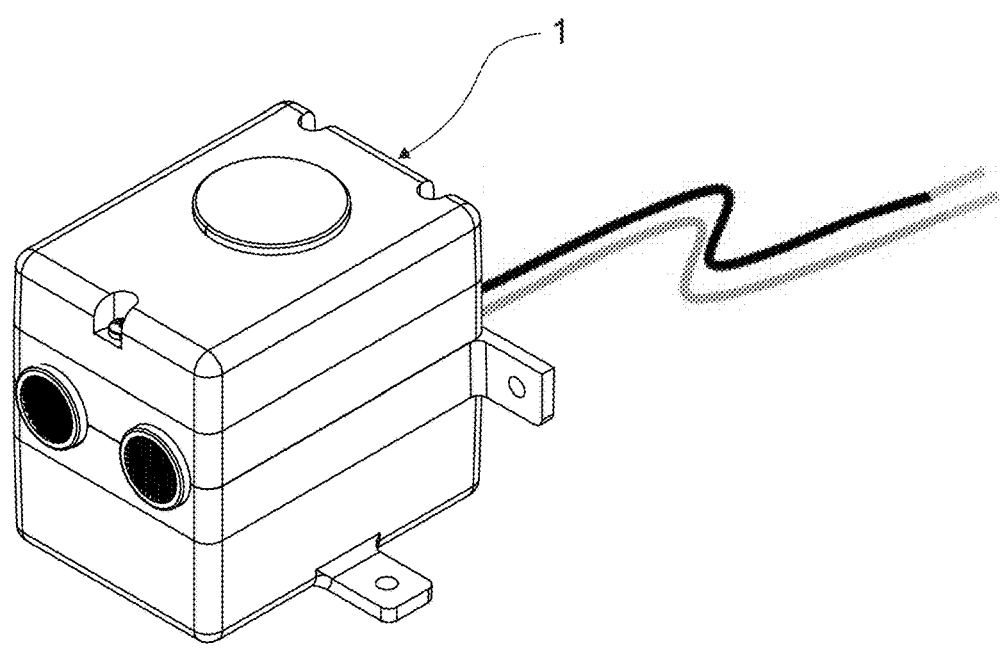
FIG. 25 depicts a perspective view of the closed sample enclosure (1) with its components, as shown in FIG. 24.
Figure 26:
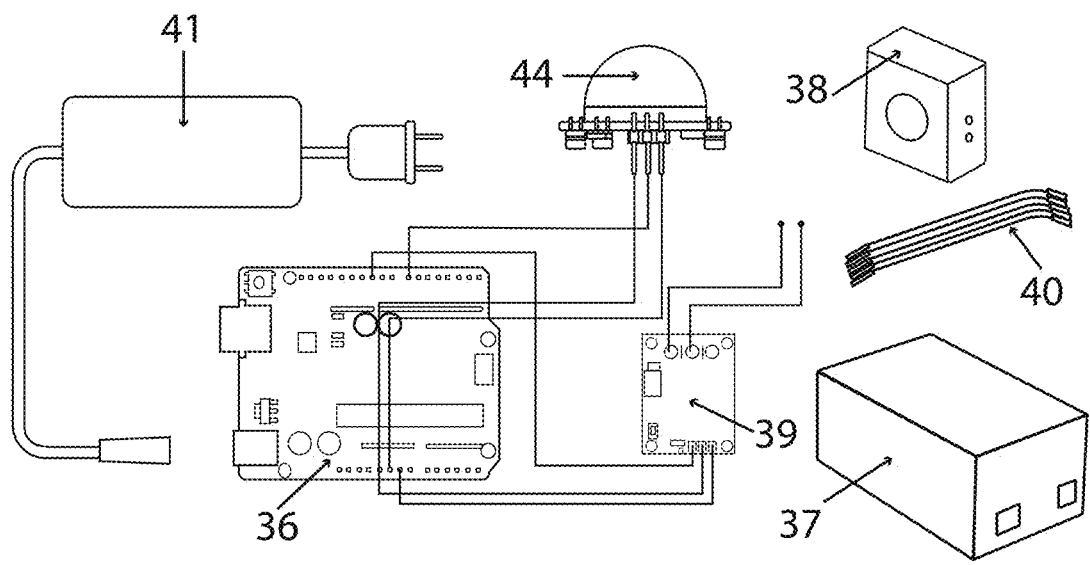
FIG. 26 depicts an example of a custom-made market IoT solution schematic, where an infrared sensor (44), an Arduino board (36), a generic enclosure (37), a mounting bracket (38), a relay board (39), connection cables (40), and the power supply (41) can be seen.
Figure 27:
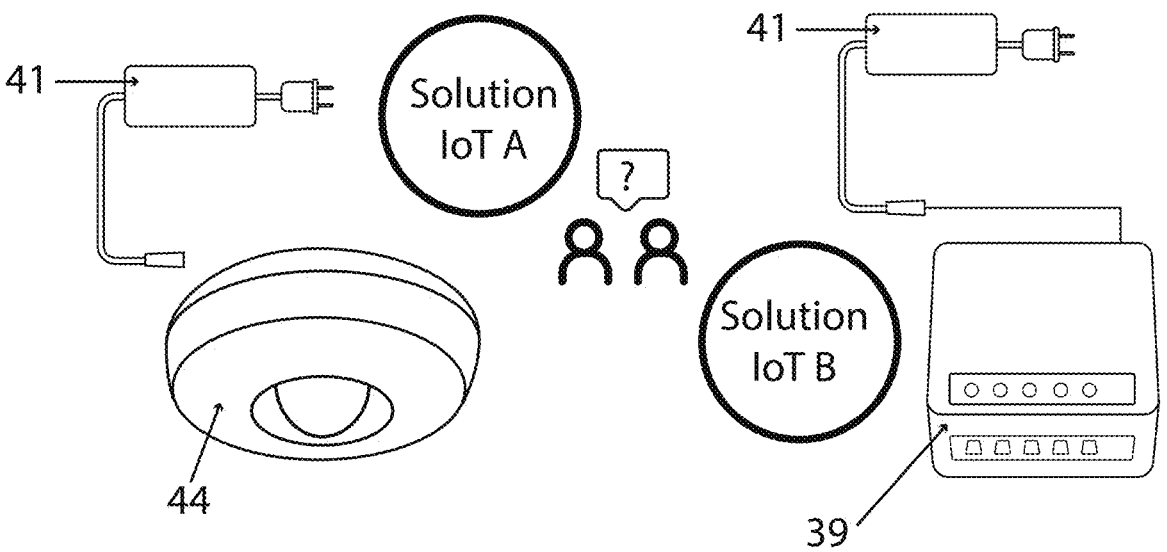
FIG. 27 depicts a second example of a custom-made market IoT solution schematic, where an infrared sensor (44), a relay board (39), and the power supplies (41) can be observed.
Figure 28:
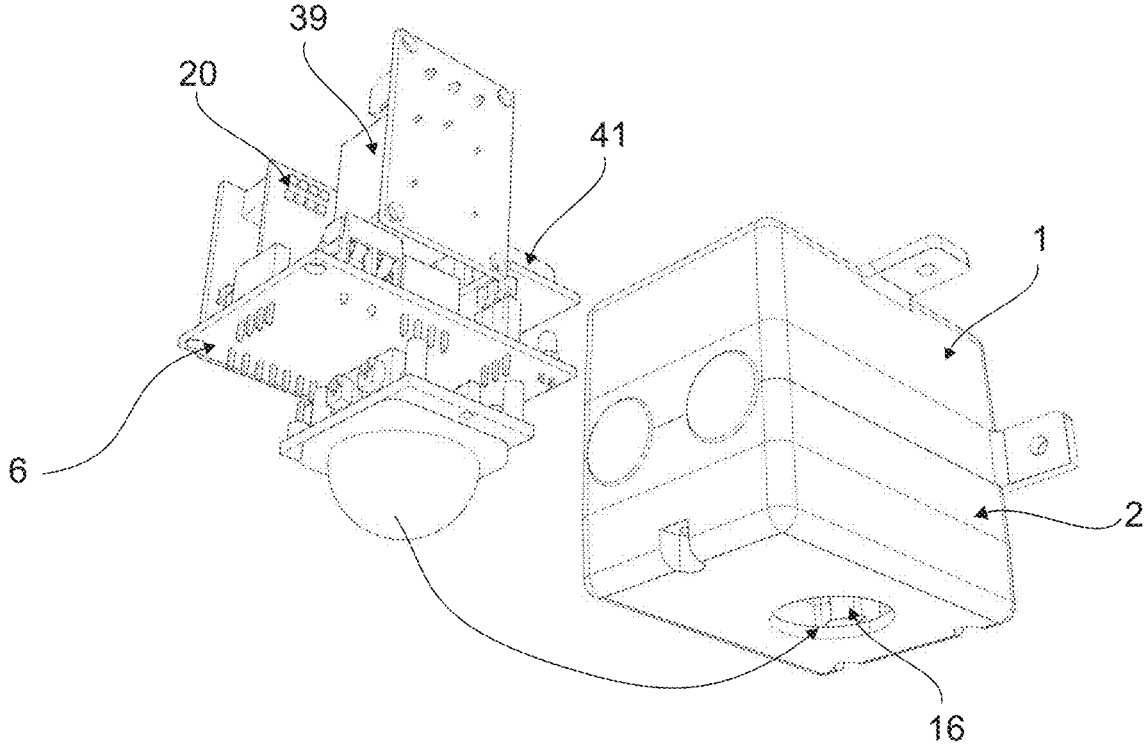
FIG. 28 depicts an example of an IoT solution schematic using the multipurpose IoT enclosure (1), where the view of the hole (16) in the enclosure cover (2), the base plate or backplane (6), the arrangement of the motherboard (20), the relay board (39), and the power supply (41) can be observed.

Additionally, the mentioned enclosure (1) provides the relevant blank covers (18) for the upper hole (16) and central holes (17) where the covers have a central notch to fit into the front semicircles (FIG. 25).

Having thus described and determined the nature of this invention, its scope and the manner in which such invention is to be carried into practice, it is hereby declared to be claimed as ownership and exclusive right:

1. A hardware receiver enclosure for developers of internet of things (IoT) systems, comprising:
an enclosure (1) having a first cover piece (2) and a second cover piece (3) operatively linked to each other, the first cover piece (2) and the second cover piece (3) including each two holes having a shape of a semicircular arch (17), when the first cover piece (2) is connected to the second cover piece (3), the corresponding semicircles-arch (17) on the cover pieces (2,3) form a hole having a shape of a circle (17), a hole located on a top section of the first cover piece (2), anchor tabs (5) located inside the second base piece (3), a base plate (6) located inside the second cover piece (3),
the base plate (6) is connected to the second cover piece
(3) by through holes (14) and fastening screws (4), a plurality of connection sockets (7) secured to the second
cover piece (3), a plurality of female printed circuit board connectors, the
female printed circuit board connectors including at
least five connectors including a two pins connector
(8), a three pins connector (9), a four pins connector
(10), a five pins connector (11), and a ten pins connec-
tor (12), a motherboard (20) connected to one of the female printed
circuit board connectors, a microprocessor and electronic interfaces located on the
motherboard for adapting to generic or Arduino voltage
levels of 3.3v and 5v DC, a power board (28) connected to one of the female printed
circuit board connectors, a double terminal power connection device (13) located
on the base plate (6) having clamps, and an infrared sensor (44) connected to one of the female
printed circuit board connectors.

2. The hardware receiver enclosure according to claim 1,
wherein the enclosure (1) contains emerging side fins for
fixation (15).

3. The hardware receiver enclosure according to claim 1,
wherein by the base plate (6) having three fastening holes
(14) associated with the first cover piece (2) or the second
cover piece (3).

4. The hardware receiver enclosure according to claim 1,
comprising covers (18) for sealing holes (16, 17) located on
the enclosure (1).

5. The hardware receiver enclosure according to claim 1,
wherein the base plate (6) is mechanically connected to the
first cover piece (2) through the holes (14).

6. The hardware receiver enclosure according to claim 1,
wherein the base plate (6) is mechanically connected to the
second cover piece (3) through the holes (14).

7. The hardware receiver enclosure according to claim 1,
wherein the second cover piece (3) is linked to a fixation fin
device (19).

* * * * *